US00RE38859E

(19) United States
(12) Reissued Patent
Jensen

(10) Patent Number: US RE38,859 E
(45) Date of Reissued Patent: Nov. 1, 2005

(54) DRIP-CATCHER

(76) Inventor: Brian Vang Jensen, Smedevej 18, Nr. Vorupoer, Thisted (DK), DK-7700

(21) Appl. No.: 09/030,253

(22) Filed: Feb. 25, 1998

Related U.S. Patent Documents

Reissue of:
(64) Patent No.: 5,651,481
Issued: Jul. 29, 1997
Appl. No.: 08/417,255
Filed: Apr. 5, 1995

U.S. Applications:
(63) Continuation of application No. 08/030,312, filed as application No. PCT/DK91/00275 on Sep. 17, 1991, now abandoned.

(30) Foreign Application Priority Data

Sep. 24, 1990 (DK) ..... 2297/90

(51) Int. Cl.[7] ..... B65D 5/74
(52) U.S. Cl. ..... 222/566; 222/1; 222/569
(58) Field of Search ..... 222/1, 530, 566, 222/569, 527, 574, 571, 526; 141/337, 338; 215/390, 391, 392, 100 R, 387, 388; D9/440, 447; D40/310, 311; 229/800

(56) References Cited

U.S. PATENT DOCUMENTS

| | | | | | |
|---|---|---|---|---|---|
| 672,657 | A | * | 3/1901 | Vautrot | 222/566 |
| 1,867,060 | A | * | 7/1932 | Carr | 222/570 |
| 1,952,288 | A | * | 3/1934 | Saxon | 222/569 |
| 2,054,265 | A | * | 9/1936 | Muguerditchian | 141/390 X |
| 2,155,049 | A | * | 4/1939 | Isaacson | 222/570 X |
| 2,193,805 | A | * | 3/1940 | Deschner | 222/566 |
| 2,272,549 | A | * | 2/1942 | Deschner | 222/526 X |
| 2,435,033 | A | * | 1/1948 | Campbell | 222/566 |
| 2,605,582 | A | * | 8/1952 | Allen | 141/337 X |
| 2,668,643 | A | * | 2/1954 | Irving | 222/566 |
| 3,179,290 | A | * | 4/1965 | Whitney | 222/571 |
| 3,181,742 | A | * | 5/1965 | Kebert | 222/527 |
| 3,290,841 | A | * | 12/1966 | Sartore | 141/390 X |
| 3,473,705 | A | * | 10/1969 | May et al. | 222/566 |
| 4,009,805 | A | * | 3/1977 | Klygis et al. | 222/530 |
| 4,749,011 | A | * | 6/1988 | Rylander | 141/390 X |
| 4,817,691 | A | * | 4/1989 | Lau | 141/390 |
| 4,896,707 | A | * | 1/1990 | Cowles | 141/337 |
| 5,078,189 | A | * | 1/1992 | Ronsonet | 141/337 |
| 5,121,779 | A | * | 6/1992 | Green | 141/337 |

FOREIGN PATENT DOCUMENTS

| | | | | |
|---|---|---|---|---|
| AT | 170315 | * | 2/1952 | |
| FR | 1198362 | * | 12/1959 | |
| GB | 2252292 | * | 8/1992 | 141/337 |
| WO | 92/05080 | * | 4/1992 | 222/571 |

* cited by examiner

*Primary Examiner*—Kenneth Bomberg
(74) *Attorney, Agent, or Firm*—Antonelli, Terry, Stout & Kraus, LLP

(57) ABSTRACT

The invention relates to a drip-catcher for, for instance, a bottle and intended for preventing dripping and drops seeping from the bottle orifice during pouring. The drip-catcher of the invention simply consists of a piece (1) of flexible and elastic foil material, preferably plastic material foil having the thickness of 0.1–0.2 mm. The diameter of the piece of material may be 60–80 mm. When used as a drip-catcher the piece of material is rolled into an oblong cylindrical form and inserted in the orifice of the bottle. Due to its elasticity the piece of material will positively engage the orifice and constitute a tube-formed outlet spout. Due to the small thickness of the foil material and its liquid-repellent nature this spout cuts off the jet very efficiently and is also a very efficient drop-catcher. The drip-catcher of the invention is extremely simple and cheap. Its use is uncomplicated and it is universally applicable because the piece of material adjusts itself to the bottle orifice irrespective of its size. The effect of the drip-catcher is remarkable due to the small thickness and liquid-repellent surface of the material.

44 Claims, 1 Drawing Sheet

DRIP-CATCHER

Matter enclosed in heavy brackets [ ] appears in the original patent but forms no part of this reissue specification; matter printed in italics indicates the additions made by reissue.

CROSS REFERENCE TO RELATED APPLICATIONS

*This application is a continuation of U.S. application No. 08/030,312 which was the National Stage of International Application No. PCT/DK91/00275 file Sep. 19, 1991, now abandoned.*

FIELD OF THE INVENTION

The present invention relates to a liquid drip-catcher for a bottle or other liquid container.

BACKGROUND OF THE INVENTION

Drip-catchers have been proposed, for example, in the form of a spout adapted to be placed in a bottle or container and intended for preventing dripping of liquid from the bottle or container when pouring.

A drip-catcher of the aforementioned type consists of a cork in which has been inserted a through-going tube-formed spout. The spout ends in an obliquely cut edge which, during the pouring of the liquid will gather the liquid in a regular well-defined jet so that splashings are avoided, and will cut off the jet at the end of the pouring so that no drop is formed at the edge of the spout. The prevention of the forming of the drop at the end of the spout is particularly important because, when a bottle is returned to an upright position, the drop remaining at the edge of the spout tends to seep downward on the outside of the bottle which is highly undesirable.

Aside from the fact that the desired effect of preventing drop formation is obtained, common disadvantages of the proposed drip-catchers resides in the fact that the proposed drip-catchers are bulky, impractical in use and relatively expensive to manufacture. Thus, the proposed drip-catchers are not suitable for being discarded after use.

Moreover, with regard to the proposed drip-catchers comprising a cork with an inserted tube, the cork will often dry up so that it does not fit tightly in the bottle or container. The liquid in the bottle container can then seep out along the cork during pouring so that the device, far from improving the pouring qualities of the bottle or container, give rise to a dirty bottle or container and dirty surroundings.

SUMMARY OF THE INVENTION

The aim of the present invention essentially resides in providing a simple, inexpensive and universally useful drip-catcher which avoids the disadvantages of the previously proposed drip-catchers, with the drip-catcher of the present invention efficiently preventing splashing and dripping of liquid during pouring of the liquid into, for example, a glass.

In accordance with advantageous features of the present invention, a drip-catcher is provided which consists of a piece of a suitable elastic and flexible sheet material, for example, plastic material, foil, or plastic laminated paper, which piece of material during use as a drip-catcher, is inserted in a container orifice or bottle neck as a cylinder-formed roll, where the material due to its elasticity by its own force positively engages an inner surface of the container opening or orifice. The material may be closed or partly slipped cylinder form constituting a tube-formed or shape-outlet spout of the container, which efficiently cuts off the flow of liquid due to the provision of a sharp edge, namely the edge of the foil.

The drip-catcher of the present invention simply consists of a round or circular piece of semi-rigid flat plastic foil having a thickness of 0.1–0.2 mm depending upon the flexibility of the selected material. Other types of material or laminations of several materials, for example, plastic-laminated paper, may also be used. The round or circular piece of material forming the drip-catcher may have a diameter of 60–80 mm.

When using the drip-catcher of the present invention, the piece of material is rolled into an oblong cylinder and one end of the oblong cylinder is inserted in a neck or opening of the bottle or container. Due to the elasticity of the material, the material tends to unroll so as to assume an original flat configuration and, in so doing, the piece of material tightly engages an inner surface of the opening of the bottle or container. In this simple way a cylinder-formed spout, which may be split or completely closed, is formed. It should be noted that the piece of material adapts itself to the opening or orifice of the bottle or container regardless of the orifice size, that is, the drip-catcher is universally useful within a relatively large diameter interval for the opening or orifice of the bottle or container.

When pouring, the liquid passes the cylindrical outlet presented by the drip-catcher. Due to the smooth and thin character of the foil material, the outlet will constitute an ideal drip-catcher because the edge of the foil cuts off the jet or flow of liquid sharply. By using a plastic material having a low adhesion effect to the liquid concerned, the formation of a drop at the cut-off edge is efficiently avoided which would otherwise, at the end of pouring, lead to a seeping of drops on the outside of the bottle or container. In other words, the drip-catcher fulfills its task efficiently in a simple manner.

The contour of the cut-out piece of material may vary within wide limits and, for example, the piece of material may be circular, elliptical, rhombic, rectangular or triangular dependent upon desire and purpose. The drip-catcher may also have printed thereon an advertisement or otherwise be used for publicity.

The drip-catcher may be disposable, that is, intended for being discarded after use and the drip-catcher may constitute part of the packaging for the bottle or the container and, for example, may be tacked in a label pocket on the bottle or container or be dispensed together with a purchased bottle or container. Alternatively, the drip-catcher may be provided with an adhesive zone for direct attachment to the bottle or container, with a tear-off line between the adhesive zone and the drip-catcher proper making it possible to detach the drip-catcher for use.

BRIEF DESCRIPTION OF THE DRAWINGS

The present invention will be more clearly described in connection with the accompanying drawing wherein.

DETAILED DESCRIPTION

Figure 1:
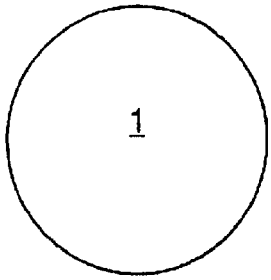
FIG. 1 is a plan view of a circular piece of material for a drip-catcher according to the invention in a starting configuration.
Figure 2:
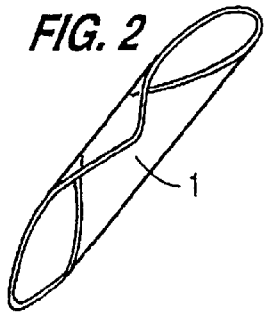
FIG. 2 is a perspective view of the piece of material of FIG. 1 in the form of a roll for inserting in a bottle or container.

In the embodiment of the drawing, the drip-catcher simply consists of a circular cutout piece 1 of 0.13 mm plastic foil or plastic laminate, for example, PVC plastic material or a similar plastic material quality. The material may be transparent or opaque and may be colored. The material possesses a suitable flexibility and elasticity dependent upon the purpose so that the cylinder form as shown in FIG. 2, namely, a cylinder having opposite truncated ends, can easily be obtained by manual rolling. The size of the piece of material depends upon the size of the bottle. For usual domestic size bottles, a diameter of 60–80 mm will be suitable.

Figure 3:
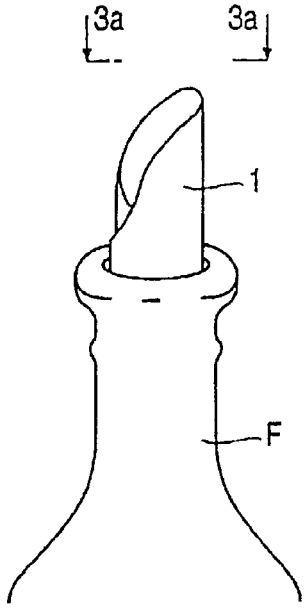
FIG. 3 is a perspective view of a piece of material of FIG. 2 inserted as a drip-catcher in a bottle.

Upon forming the piece of material into a cylinder (FIG. 2) the formed piece of material is inserted into the mouth or opening of the bottle (FIG. 3). Due to the elasticity, the piece 1 of material will tend to unroll into its original flat configuration which however the mouth of the opening of the bottle will prevent. The material will engage an interior of the mouth or opening of the bottle F thereby forming a spout-like outlet of the bottle F. Presuming the neck regularly round and smooth, the piece 1 of material will seal efficiently inside the bottleneck and provide an ideal bottle outlet.

During a pouring operation, the thin sharp edge of the piece 1 of foil material at the outlet edge 2 brings about that the jet V of liquid is efficiently cutoff when the pouring is terminated, that is, when the bottle F is returned to an upright position. The cutting off prevents the formation of drops at the outlet edge 2, which drops would otherwise seep down on the outside of the bottle F. The drop-repelling effect is enhanced by using a type of plastic material for the drip-catcher having a low surface adhesion to the liquid concerned.

Figure 3A:
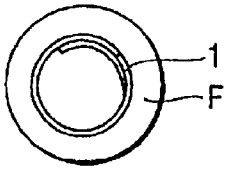
FIG. 3a is a view taken in direction of the arrows 3a-3a in FIG. 3.
Figure 3B:
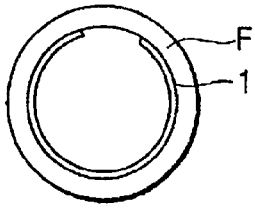
FIG. 3b is a view similar to FIG. 3a with the drip-catcher of FIG. 2 introduced into a bottle having a somewhat larger diameter opening or orifice.
Figure 4:
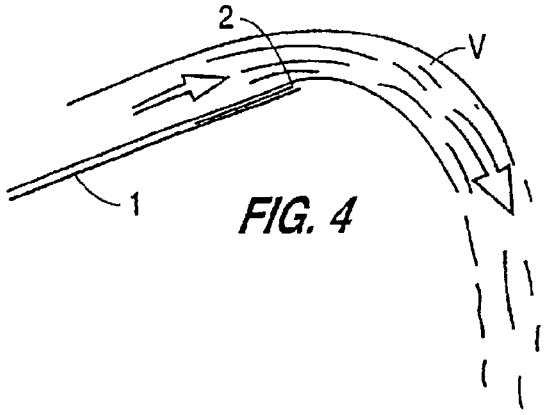
FIG. 4 is an enlarged sectional view of an outlet or cut-off edge of the drip-catcher, with liquid pouring out through the outlet.
Figure 6A:
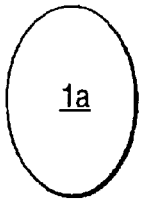
FIGS. 6a–6d are plan views of alternate configurations of the piece of material for forming the drip-catcher in accordance with the present invention.
Figure 6B:
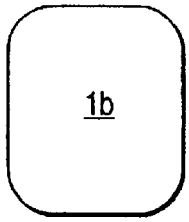
Figure 6C:
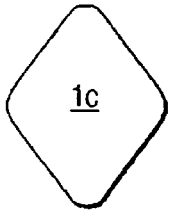
Figure 6D:
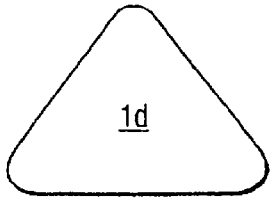
Figure 5:
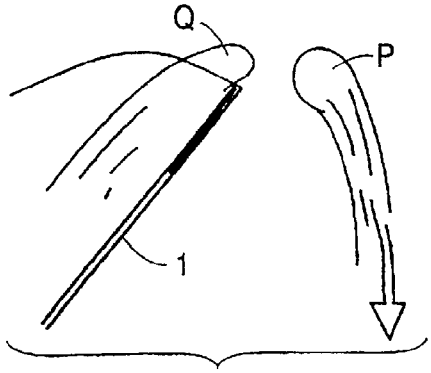
FIG. 5 is enlarged sectional view similar to FIG. 4 at the end of a pouring of the liquid.

As apparent from the above description, the drip-catcher is self adjusting, that is, the drip-catcher may be used for bottles F of varying size as shown in FIGS. 3a and 3b. Thus, the drip-catcher is universally applicable. The cutting-off effect of the drip catcher is illustrated in FIGS. 4 and 5 showing the pouring operation at the outlet edge and the termination of pouring, respectively, in which latter situation the jet V of liquid is cut into a portion P which continues leaving the bottle F and a pouring portion Q which returns to the bottle F. It should be noted that the sharp edge of the foil prevents drops from clinging to it, all in connection with the smooth liquid-repelling surface of the foil material and the surface tension of the liquid.

The alternative configurations of the piece 1a, 1b, 1c, 1d of material for the drip-catcher of the present invention are shown in FIGS. 6a, 6b, 6c, 6d. The pieces 1a, 1b, 1c, 1d of material should preferably present rounded corners which brings about the best drip-catching effect.

What is claimed is:

1. A drip catcher in combination with a container having an opening from which a liquid is poured for enabling drip free pouring of the liquid from the container and for preventing drips of the liquid during pouring from leaking from the container down an outside surface thereof comprising:

a resilient and rolled sheet of material having a circular cross section positioned in the opening of the container from which drip and leak free pouring of the liquid is made, the resilient and rolled sheet having an outer diameter conforming to the opening of the container with the outer diameter extending from a first end of a tube to a second end of the tube, a fluid tight seal disposed at the first end between an outer surface of the tube and a surface defining the opening to prevent flow of the liquid between an outer surface of the tube and the inner surface of the opening of the container and a pour spout disposed at the second end having an edge within the outer diameter for cutting off the flow of liquid at the end of pouring without the formation of drips; and wherein the sheet of material, prior to being rolled, has only an outwardly curved outside periphery defining a continuous flat surface which upon rolling forms the pour spout with the edge of the pour spout being formed from a portion of the outside periphery.

2. A drip catcher in combination with a container in accordance with claim 1, wherein:

the material is flexible and elastic with the fluid-tight seal being formed by the elasticity and flexibility of the material producing a radially outward force causing the diameter of the tube to expand outward to conform to the opening of the container.

3. A drip catcher in combination with a container in accordance with claim 2, wherein:

an inner surface of the tube has a property of repelling the liquid and a low adhesion for the liquid whereby formation of drips at the edge of the pour spout are lessened.

4. A drip catcher in combination with a container in accordance with claim 3 wherein:

the sheet has a thickness of 0.1 to 0.2 mm providing the elasticity and flexibility which form the fluid tight seal with the opening of the container.

5. A drip catcher in combination with a container in accordance with claim 2 wherein:

the sheet has a thickness of 0.1 to 0.2 mm providing the elasticity and flexibility which form the fluid tight seal with the opening of the container.

6. A drip catcher in combination with a container in accordance with claim 1, wherein:

an inner surface of the tube has a property of repelling the liquid and a low adhesion for the liquid whereby formation of drips at the edge of the pour spout are lessened.

7. A drip catcher in combination with a container in accordance with claim 1, wherein:

the tube has opposed portions of the sheet which overlap.

8. A drip catcher in combination with a container in accordance with claim 1, wherein:

the tube has opposed portions of the sheet which are non-overlapping.

9. A drip catcher in combination with a container in accordance with claim 1, wherein:

the sheet is plastic.

10. A drip catcher in combination with a container in accordance with claim 1, wherein:

the sheet is a metal foil.

11. A drip catcher in combination with a container in accordance with claim 1, wherein:

the sheet, prior to being rolled, is circular having a diameter between 60 and 80 mm and upon being rolled, the outer diameter of the tube is equal to the opening of the container which is a wine bottle.

12. A method of drip free pouring of a liquid comprising:

providing a container having an opening from which the liquid is to be poured;

rolling a resilient sheet of material into a tube having a circular cross section, the sheet of material, prior to being rolled, having only an outwardly curved outside periphery defining a continuous flat surface which upon rolling forms the pour spout with the edge of the pour spout being formed from portion of the outside periphery;

positioning the tube in the opening of the bottle with the tube as positioned in the opening having an outer diameter conforming to the opening of the container with the outer diameter extending from a first end of the tube to a second end of the tube to form a fluid seal disposed at the first end between an outer surface of the tube and a surface defining the opening to prevent flow of the liquid between the outer surface of the tube and the inner surface of the opening of the container and a pour spout disposed at the second end having an edge within the outer diameter for cutting off the flow of liquid at the end of pouring without the formation of drips; and pouring the liquid from the container through the tube past the edge and cutting off the flow of liquid with the edge to stop the formation of drips.

13. A method in accordance with claim 12 wherein:

the material is flexible and elastic, and forming the fluid tight seal with elasticity and flexibility of the material producing a radially outward force causing the diameter of the tube to expand outward to conform to the opening of the container.

14. A method in accordance with claim 12 wherein:

an inner surface of the tube has a property of repelling the liquid and a low adhesion for the liquid and lessening formation of drips at the edge of the pour spout during cutting off the flow as a result of the inner surface repelling the liquid and the low adhesion of the inner surface for the liquid.

15. A method in accordance with claim 12 wherein:

the tube has opposed portions of the sheet which overlap.

16. A method in accordance with claim 12 wherein:

the tube has opposed portions of the sheet which are non-overlapping.

17. A method in accordance with claim 12 wherein:

the sheet is plastic.

18. A method in accordance with claim 12 wherein:

the sheet has a thickness of 0.1 to 0.2 mm providing the elasticity and flexibility which form the fluid tight seal with the opening of the container.

19. A method in accordance with claim 12 wherein:

the sheet, prior to being rolled, is circular having a diameter between 60 and 80 mm and the outer diameter of the tube is equal to a diameter of a wine bottle.

*20. A drip catcher in combination with a container having an opening from which a liquid is poured for enabling drip free pouring of the liquid from the container and for preventing drips of the liquid during pouring from leaking from the container down an outside surface thereof comprising:*

*a resilient and rolled sheet of material having a circular cross section positioned in the opening of the container from which drip and leak free pouring of the liquid is made, the resilient and rolled sheet having an outer diameter conforming to the opening of the container with the outer diameter extending from a first end of a tube to a second end of the tube, a fluid tight seal disposed at the first end between an outer surface of the tube and a surface defining the opening to prevent flow of the liquid between an outer surface of the tube and the inner surface of the opening of the container and a pour spout disposed at the second end having an edge within the outer diameter for cutting off the flow of liquid at the end of pouring without the formation of drips; and wherein*

*the sheet of material, prior to being rolled, has an outside periphery including at least one outwardly curved section defining a flat surface which upon rolling forms the pour spout with the edge of the pour spout being formed from one of the at least one outwardly curved section of the outside periphery.*

*21. A drip catcher in combination with a container in accordance with claim 20, wherein:*

*the outside periphery has at least a pair of outwardly curved sections with the pour spout being formed from one of the at least one pair of curved sections.*

*22. A drip catcher in combination with a container in accordance with claim 21, wherein:*

*the outside periphery has two pairs of outwardly curved sections with the pour spout being formed from one of the two pairs of outwardly curved sections.*

*23. A drip catcher in combination with a container in accordance with claim 21, wherein:*

*the at least one pair of outwardly curved sections are opposed to each other.*

*24. A drip catcher in combination with a container in accordance with claim 21, wherein:*

*the at least one pair of outwardly curved sections comprise three outwardly curved sections which are at corners of a triangle.*

*25. A drip catcher in combination with a container in accordance with claim 21, wherein:*

*the material is flexible and elastic with the fluid-tight seal being formed by the elasticity and flexibility of the material producing a radially outward force causing the diameter of the tube to expand outward to conform to the opening of the container.*

*26. A drip catcher in combination with a container in accordance with claim 25, wherein:*

*an inner surface of the tube has a property of repelling the liquid and a low adhesion for the liquid whereby formation of drips at the edge of the pour spout are lessened.*

*27. A drip catcher in combination with a container in accordance with claim 26, wherein:*

*the sheet has a thickness of 0.1 to 0.2 mm providing the elasticity and flexibility which form the fluid tight seal with the opening of the container.*

*28. A drip catcher in combination with a container in accordance with claim 25, wherein:*

*the sheet has a thickness of 0.1 to 0.2 mm providing the elasticity and flexibility which form the fluid tight seal with the opening of the container.*

*29. A drip catcher in combination with a container in accordance with claim 25, wherein:*

*the tube has opposed portions of the sheet which overlap.*

*30. A drip catcher in combination with a container in accordance with claim 25, wherein:*

*the tube has opposed portions of the sheet which are non-overlapping.*

*31. A drip catcher in combination with a container in accordance with claim 25, wherein:*

*the sheet is a metal foil.*

*32. A drip catcher in combination with a container in accordance with claim 20, wherein:*

*the material is flexible and elastic with the fluid-tight seal being formed by the elasticity and flexibility of the material producing a radially outward force causing the diameter of the tube to expand outward to conform to the opening of the container.*

*33. A drip catcher in combination with a container in accordance with claim 32, wherein:*

*an inner surface of the tube has a property of repelling the liquid and a low adhesion for the liquid whereby formation of drips at the edge of the pour spout are lessened.*

*34. A drip catcher in combination with a container in accordance with claim 32, wherein:*

*the sheet has a thickness of 0.1 to 0.2 mm providing the elasticity and flexibility which form the fluid tight seal with the opening of the container.*

*35. A drip catcher in combination with a container in accordance with claim 20, wherein:*

*the sheet has a thickness of 0.1 to 0.2 mm providing an elasticity and flexibility which form the fluid tight seal with the opening of the container.*

*36. A drip catcher in combination with a container in accordance with claim 20, wherein:*

*the tube has opposed portions of the sheet which overlap.*

*37. A drip catcher in combination with a container in accordance with claim 20, wherein:*

*the tube has opposed portions of the sheet which are non-overlapping.*

*38. A drip catcher in combination with a container in accordance with claim 20, wherein:*

*the sheet is plastic.*

*39. A drip catcher in combination with a container in accordance with claim 20, wherein:*

*the sheet is a metal foil.*

*40. A method of drip free pouring of a liquid comprising:*

*providing a container having an opening from which the liquid is to be poured;*

*rolling a resilient sheet of material into a tube having a circular cross section, the sheet of material, prior to being rolled, having an outside periphery including at least one outwardly curved section defining a flat surface which upon rolling forms a pour spout with an edge of the pour spout being formed from one of the at least one outwardly curved section of the outside periphery;*

*positioning the tube in the opening of the bottle with the tube as positioned in the opening having an outer diameter conforming to the opening of the container with the outer diameter extending from a first end of the tube to a second end of the tube to form a fluid seal disposed at the first end between an outer surface of the tube and a surface defining the opening to prevent flow of the liquid between the outer surface of the tube and the inner surface of the opening of the container and the pour spout is disposed at the second end having the edge within the outer diameter for cutting off the flow of liquid at the end of pouring without the formation of drips; and*

*pouring the liquid from the container through the tube past the edge and cutting off the flow of liquid with the edge to stop the formation of drips.*

*41. A method in accordance with claim 40, wherein:*

*the outside periphery has at least a pair of outwardly curved sections with the pour spout being formed from one of the at least one pair of outwardly curved sections.*

*42. A method in accordance with claim 41 wherein:*

*the at least one pair of outwardly curved sections are opposed to each other.*

*43. A method in accordance with claim 41, wherein:*

*the at least one pair of outwardly curved sections comprise three curved sections which are at corners of a triangle.*

*44. A method in accordance with claim 40, wherein:*

*the outside periphery has two pairs of outwardly curved sections with the pour spout being formed from one of the two pairs of outwardly curved sections.*

* * * * *